106. COMPOSITIONS,
99 COATING OR PLASTIC.

No. 767,434. Patented August 16, 1904.

UNITED STATES PATENT OFFICE.

ARTHUR W. PERKINS, OF RUTLAND, VERMONT.

COMPOSITION FOR WALL-PLASTER, &c.

SPECIFICATION forming part of Letters Patent No. 767,434, dated August 16, 1904.

Application filed November 9, 1903. Serial No. 180,436. (No specimens.)

*To all whom it may concern:*

Be it known that I, ARTHUR W. PERKINS, a citizen of the United States of America, and a resident of Rutland, in the county of Rutland, State of Vermont, have invented certain new and useful Improvements in Compositions for Wall-Plaster, &c., of which the following is a specification.

This invention relates to certain new and useful improvements in compositions for wall-plaster, &c., applicable also to exterior work, such as roofing, the sides of buildings, and other similar uses.

I propose to make the material into tiles for the roof and blocks and sheets for the walls of buildings, while for the interior it may be applied in any desired manner.

The exterior of the building, no matter of what material it may be constructed, can be covered with my improved composition, forming a solid body that is wind, frost, and water proof, as well as proof against decay and deterioration and unaffected by the elements. It is also especially fireproof.

My improved composition consists of the following ingredients in substantially the proportions specified, by weight: Portland cement, two hundred pounds; calcined gypsum, (or plaster,) two hundred pounds; fire-clay, five hundred pounds; asbestos fiber, fifty pounds; chemical retarder, two and one-half pounds. These are prepared and mixed by any suitable process, and while the above proportions are what I have found by experience to be best for ordinary purposes it is evident that the proportions may be varied for different uses without departing from the spirit of the invention or sacrificing any of its advantages. For instance, for exterior work and under certain conditions more Portland cement may be required to give greater hardness, and for interior work more gypsum may be employed to give quicker hardening qualities, or more fire-clay may be used to give greater smoothness in applying, as well as greater fire resistance.

Any suitable chemical retarder may be employed, such, for instance, as "stucco" retarder, which is a commercial article known by that name, and an earth product obtained in the State of Iowa. It is a powerful retarding agent, so that a relatively small quantity thereof is necessary. Its purpose is to hinder or delay the setting of the plaster, and thus avoid cracking.

The asbestos fiber is acted upon by the other ingredients, so that it becomes practically homogeneous with the others, and the result is a plaster having the following desirable and valuable characteristics.

For interior work my composition possesses the following valuable features: It provides a strong, firm, dense, air-tight, flexible, fireproof wall that can be tinted, decorated, or papered, as may be desired. It is impervious to moisture, a non-conductor of electricity, a deadener of sound, pliable, it will dent like wood, but will not break. It can be cut and nailed like wood. It dries in one-fourth the time required for other wall materials and is only about one-fourth its weight. It will adhere firmly to stone, brick, wood, iron, laths of wood, or the patent metal lathing.

For exterior use it has the following desirable qualities: It is strong, firm, dense, waterproof, fireproof, and flexible. It can be cut and nailed like wood, can be bent around corners or curves, will not decay or be affected by the weather, can be painted or stained, and will not chip or break or pit.

The composition can be made into sheets or blocks of any desired dimensions and thickness and can be molded to give it any fanciful shape desired. It can be applied to uses other than those above enumerated.

What is claimed as new is—

1. A composition for building-blocks, plaster, &c., consisting of Portland cement, calcined gypsum, fire-clay, asbestos fiber and chemical retarder.

2. A composition for building-blocks, plaster, &c., composed of Portland cement, calcined gypsum, fire-clay, asbestos fiber and chemical retarder in substantially the proportions specified, that is, two hundred pounds, two hundred pounds, five hundred pounds, fifty pounds and two and one-half pounds respectively.

Signed by me at Rutland, Vermont, this 7th day of November, 1903.

ARTHUR W. PERKINS.

Witnesses:
J. C. FLYNN,
M. L. MAXWELL.